Patented Sept. 21, 1954

2,689,829

UNITED STATES PATENT OFFICE 2,689,829

SEAWATER DESALTING COMPOSITION

Calvin Calmon, Browns Mills, N. J., assignor to The Permutit Company, New York, N. Y., a corporation of Delaware No Drawing. Application August 1, 1949, Serial No. 108,059

4 Claims. (Cl. 252—179)

This invention relates to a composition and process for rendering seawater potable.

Various chemical processes have been proposed for converting seawater into drinking water under emergency conditions. Usually, weight and space are at a premium when a person is stranded at sea, and this is particularly true in the case of aviators who may be forced to make emergency landings at sea and provide themselves with drinking water for a considerable period of time.

One of the best and most extensively used chemical desalting procedures for rendering seawater potable is based upon the addition to the seawater of chemicals consisting principally of a mixture of silver zeolite with a smaller quantity of barium hydroxide. In some cases a small amount of silver oxide has been used in the composition, and if sulfate reduction is not considered important the silver zeolite may be used with a small amount of silver oxide, omitting the barium hydroxide. It is important in such compositions to obtain as high a proportion of drinking water as possible for the weight and volume of chemicals employed: Ion Exchange, by F. C. Nachod, 1949, pages 159–166. Because of this, the chemicals have commonly been briquetted to compress them into a smaller space (U. S. Patent No. 2,494,784).

In the ordinary procedure for rendering the seawater potable, a measured quantity of seawater is placed in a container, a briquet of the chemicals is added, and the mixture is kneaded or agitated until the chemicals have thoroughly reacted with the salts in the seawater. The potable water which is left is usually sucked off through a filter and is satisfactory for drinking purposes without any further treatment.

One problem with such briquets of chemicals, or mixtures of chemicals, is to provide a silver zeolite having a high capacity for removal of sodium chloride. Briquets can be made using as the silver zeolite a silver alumino silicate which has an unusually high capacity, but the briquets upon storage for long periods of time, and particularly if stored at elevated temperatures such as around 50° C., lose to some extent their high capacity for desalting seawater, and as a consequence are not capable of producing as high a proportion of potable water as would be desired.

An object of my invention is to prepare a zeolite composition for use in rendering seawater potable in such a manner that no substantial loss of capacity of the zeolite takes place upon storage at elevated temperatures.

Another object of my invention is to provide a mixture of chemicals for desalting water which can be utilized at substantially full strength as originally prepared and which retains its strength even after storage for long periods of time.

I have discovered that the cause of reduction or loss of capacity to react with seawater in such a chemical desalting composition is due to some interaction or reaction between the silver zeolite and the oxide or hydroxide of a heavy metal such as barium or silver. I have further discovered that if the area of surface contact between the zeolite and heavy metal oxide or hydroxide is reduced sufficiently, this loss of capacity can be satisfactorily controlled. If these ingredients are maintained physically separate from each other in the mixture, this reaction does not take place and the zeolite and composition as a whole retains its high capacity for desalting even though the composition may be stored at elevated temperatures for long periods of time.

Various methods and means are available for reducing the area of contact of these materials to a desirable low level, or keeping these materials physically separated from each other.

One procedure, and a procedure that is preferred for mixtures containing only a small amount such as around 5% of the heavy metal oxide or hydroxide, is to form the heavy metal oxide or hydroxide into a pill or pellet and then incorporate this pill or pellet in the silver zeolite powder at the time that it is briquetted. If desired, the oxide or hydroxide may be incorporated in the form of several separate pills or pellets. Other constituents of the composition may, of course, be mixed with the silver zeolite powder before the composition is briquetted, or, if convenient, may be incorporated with the heavy metal oxide or hydroxide. This arrangement does not completely prevent physical contact between the heavy metal oxide or hydroxide and silver zeolite but limits the contact to the very small area of the heavy metal oxide or hydroxide pill or pellet surface which is relatively inconsequential as compared with the contact area presented by powdered heavy metal oxide dispersed in the silver zeolite. The approximate surface area, for example, of barium hydroxide powder as commonly used, is 600 square centimeters per gram. On the other hand, the approximate surface area of a single pellet of barium hydroxide may be as little as 5 to 10 $cm.^2$/gram depending upon the shape of the pellet, degree of compression and the like. I have found that if the surface area of the heavy metal oxide or hydroxide does not exceed 150 square centimeters per gram of the material, the amount of interaction or reaction between the zeolite and heavy metal oxide or hydroxide does not reduce the effectiveness of the zeolite below a workable level. This means, of course, that the heavy metal oxide or hydroxide does not have to be pelleted but may be used in relatively coarse mesh particles instead of in the form of a fine powder.

Another procedure is to coat the particles of one or both of the powdered materials with a suitable coating capable of keeping the materials physically separated from each other until they are ready to react with the compounds in the seawater. If the composition contains only a small amount of the heavy metal oxide or hydroxide, it is more practical, of course, to apply the coating only to this smaller quantity of material. Such a coating should be a heat stable, water soluble and non-toxic substance that would be harmless if taken internally by a person. Examples of suitable materials that can be used for such coating purposes are gelatin, starch, sugar and the like.

Another possible way of maintaining the silver zeolite and heavy metal oxide or hydroxide physically separated from each other is to use a mechanical spacer between the materials, or actually form separate packages in some fashion of the heavy metal oxide or hydroxide and silver zeolite. This detracts in some measure from the simplicity of having all of the necessary chemicals present in one single briquet, a feature which is considered particularly advantageous from the point of view of making the process as foolproof as possible.

When the heavy metal oxide or hydroxide, such as barium hydroxide, is separately formed into one or more pills or pellets and is then incorporated in a briquet consisting essentially of silver zeolite, it is usually desirable to provide some kind of a disrupter in the pills or pellets as well as in the briquet itself so that both constituents of the composition will be quickly dispersed throughout the seawater when the briquet is added to the seawater.

I have found that the same kind of disrupter may be used in both the pill or pellet of heavy metal oxide or hydroxide and the briquet of silver zeolite. A small amount of a suitable type of bentonite clay may, for example, be mixed with the heavy metal oxide or hydroxide as well as with the silver zeolite for this purpose.

In order to demonstrate the difference in results obtained by physically separating the heavy metal oxide or hydroxide from the silver zeolite, the following example is given.

*Example I.*—Several desalting briquets were prepared by briquetting an intimate mixture of silver zeolite and barium hydroxide powders with other materials and designated as series A. Each of these briquets had the following composition.

| | Grams |
|---|---|
| Silver zeolite | 69.0 |
| Disrupter | 0.7 |
| Stearic acid | 0.8 |
| Activated carbon | 0.2 |
| Barium hydroxide | 3.0 |

Another series of briquets containing the barium hydroxide in the form of a separate pellet embedded in the silver zeolite briquet was prepared and designated as series B. Each of these briquets had the following composition:

| | Briquet, g. | Pellet, g. |
|---|---|---|
| Silver Zeolite | 69.0 | None |
| Disrupter | 0.7 | 0.1 |
| Stearic Acid | 0.8 | 0.1 |
| Activated Carbon | 0.2 | 0.05 |
| Barium Hydroxide | None | 3.0 |

The performance of these two series of briquets was determined by the following procedure, each briquet being used to treat 500 ml. of a standard seawater having the following composition:

| Cations | p.p.m. as $CaCO_3$ | Anions | p.p.m. as $CaCO_3$ |
|---|---|---|---|
| Calcium | 850 | Bicarbonate | 100 |
| Magnesium | 4,800 | Sulfate | 2,350 |
| Sodium | 21,550 | Chloride | 24,750 |

The measured volume of standard seawater was placed in a flexible plastic bag of the type described in United States Patent No. 2,372,391, and one briquet was added to the bag and its closure was fastened. The briquet was mildly kneaded to disintegrate it and after kneading for about 10 minutes the bag was placed on a shaking wheel until the total time from the introduction of the briquet had amounted to one hour. The bag was then supported and the outlet plug removed, the water being drawn off by means of a vacuum flask through a filter built into the outlet end of the bag. A sample of the effluent was collected and analyzed.

The performance of freshly prepared briquets of each series was as follows.

| Series | "A" | "B" |
|---|---|---|
| Disruption—min | 2½ | 2 |
| Total Filt.—Time, min | 17 | 20 |
| Total Filt.—Volume, ml | 450 | 455 |
| pH | 9.7 | 9.75 |
| Chloride (p. p. m as $CaCO_3$) | 2,710 | 2,610 |
| Sulfate (p. p. m. as $CaCO_3$) | 1,390 | 950 |
| Methyl orange Alk. (p. p. m. es. $CaCO_3$) | 78 | 76 |
| Phenol phthalein Alk (p. p. m. as $CaCO_3$) | 24 | 24 |
| Hydroxide Alk. (p. p. m. as $CaCO_3$) | 0 | 0 |
| Total Hardness (p. p. m. as $CaCO_3$) | 256 | 116 |

Briquets from each series were stored for a period of 1 week at a temperature of 75° C., and at the end of this time these briquets were tested for performance with the following results:

| Series | "A" | "B" |
|---|---|---|
| Disruption—min | 2½ | 2 |
| Total Filt.—Time, min | 20 | 20 |
| Total Filt.—Vol., ml | 460 | 460 |
| pH | 9.5 | 9.6 |
| Chloride (p. p. m. as $CaCO_3$) | 3,320 | 2,660 |
| Sulfate (p. p. m. as $CaCO_3$) | 1,450 | 910 |
| Methyl orange Alk. (p. p. m. as $CaCO_3$) | 176 | 134 |
| Phenol phthalein Alk. (p. p. m. as $CaCO_3$) | 46 | 38 |
| Hydroxide Alk. (p. p. m. as $CaCO_3$) | 0 | 0 |
| Total Hardness (p. p. m. as $CaCO_3$) | 1,000 | 420 |

The disruption time was considered to be the time required from the introduction of the briquet into the seawater until the disappearance of any noticeable lumps.

The differences in results obtained in the foregoing tests were considered striking in view of the short period of storage that was used. For example, the loss of ability to remove chlorides in the series A or ordinary briquets is shown by a rise of about 600 p. p. m. in the chloride content of the water tested with the stored briquets.

The series B briquets produced practically the same chloride content in the water after storage as they did before storage.

It is also manifest that the series B briquets produce a superior reduction after storage in both the sulfate content and total hardness of the water. In this connection it should also be noted that the series B briquets produce a much greater sulfate reduction than the series A briquets even before storage. I am unable to explain the reason for this much greater sulfate reduction when the barium hydroxide is pelleted but it does make possible the use of less barium hydroxide in the briquets.

While I do not wish to be bound by any theory, I believe that some chemical interaction takes place between the zeolite structure itself and the heavy metal oxide or hydroxide when these two materials are stored in intimate physical contact with each other at temperatures such as occur in tropical countries or even in storage places located in the temperate zone but exposed to the sun's radiation. I believe this reaction is not in the nature of an ion exchange reaction but is a chemical reaction between the core or body of the zeolite and the heavy metal oxide or hydroxide which reduces or limits the operating capacity of the zeolite for ion exchange reactions. In any event, I have found that by maintaining such a zeolite more or less physically separate from the heavy metal oxide or hydroxide such as silver oxide and barium hydroxide, the desalting composition does not lose its effectiveness when stored for relatively long periods of time even though it is subjected during this period to fairly high temperatures. For most practical purposes, when some loss of effectiveness of the zeolite can be tolerated, I have found that it is sufficient to reduce the area of contact between the zeolite and the oxide or hydroxide to less than 150 square centimeters per gram of the heavy metal oxide or hydroxide employed. I have referred to heavy metal oxides or hydroxides but it will be apparent to those skilled in the art that the same treatment and consideration should be applied to both of these compounds when more than one is incorporated in a desalting mixture. For example, when such a composition contains both silver oxide and barium hydroxide, it is desirable to pellet both of these compounds, either separately or together.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A dry composition compressed into a briquet for use in converting seawater upon reaction therewith into potable water, said composition comprising essentially a mixture of finely divided silver zeolite and barium hydroxide with the zeolite constituting the major proportion of the composition, in which the barium hydroxide is incorporated in the briquet so that during storage and prior to reaction with water the area of physical contact with the silver zeolite is less than 150 square centimeters per gram of barium hydroxide.

2. A dry composition compressed into a briquet for use in converting seawater upon reaction therewith into potable water, said composition comprising essentially a mixture of finely divided silver zeolite, silver oxide and barium hydroxide with the zeolite constituting the major proportion of the composition, in which the silver oxide and barium hydroxide are incorporated in the briquet so that during storage and prior to reaction with water the area of physical contact with the silver zeolite is less than 150 square centimeters per gram of silver oxide and barium hydroxide.

3. A dry composition as defined in claim 1 in which the barium hydroxide is incorporated in the briquet in the form of at least one pellet.

4. A dry composition as defined in claim 2 in which the silver oxide and barium hydroxide are incorporated in the briquet in the form of at least one pellet.

References Cited in the file of this patent

UNITED STATES PATENTS

| Number | Name | Date |
|---|---|---|
| 1,689,036 | Leiss | Oct. 23, 1928 |
| 2,322,689 | Goetz | June 22, 1943 |
| 2,445,669 | Goetz | July 20, 1948 |
| 2,452,179 | Bunting | Oct. 26, 1948 |
| 2,494,784 | Tiger | Jan. 17, 1950 |
| 2,600,719 | Wood | June 17, 1952 |

OTHER REFERENCES

Nachod: Ion Exchange, 1949, pages 160–166.